April 29, 1969   A. P. E. FROMANTIN   3,440,672
SHOEMAKING DEVICE
Filed Feb. 15, 1967

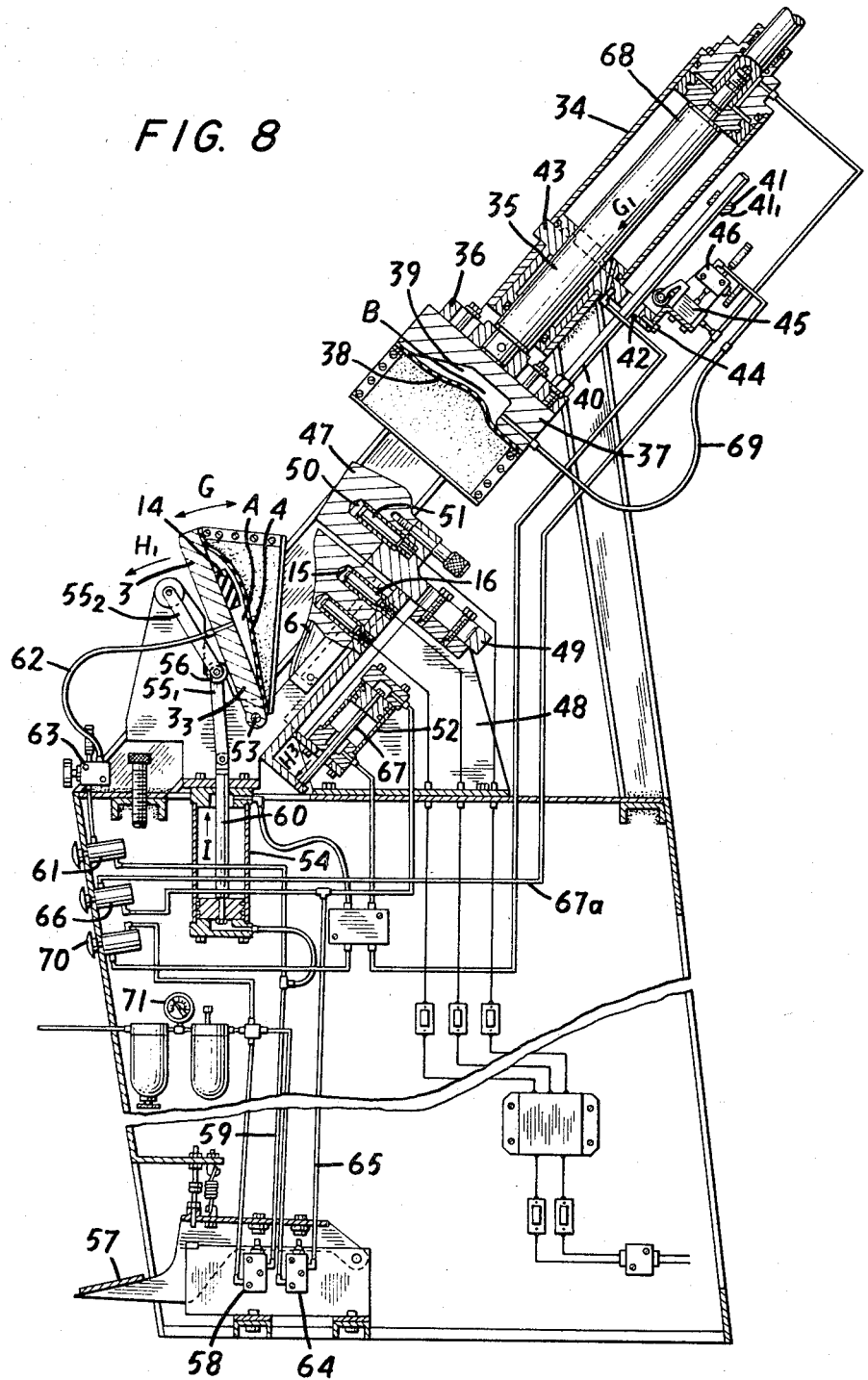

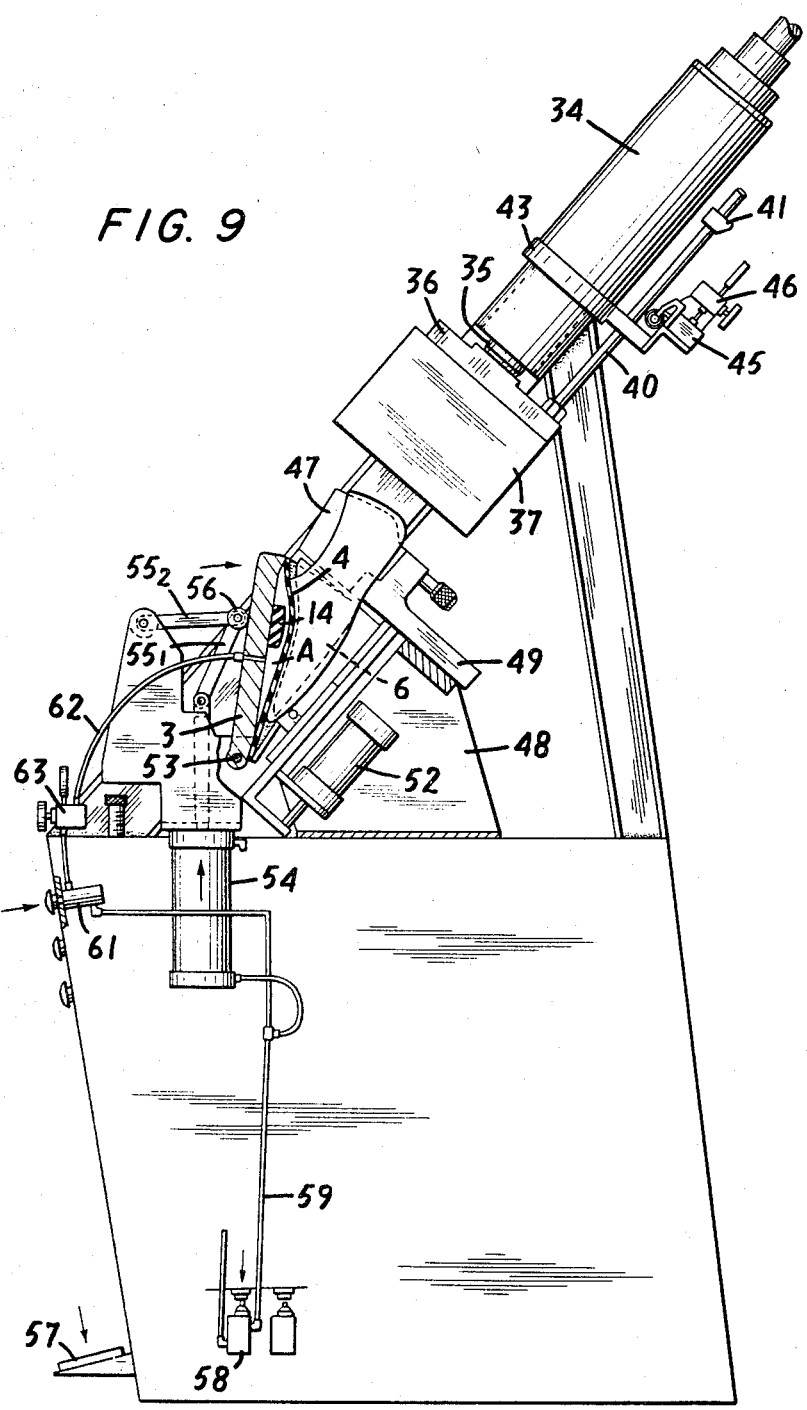

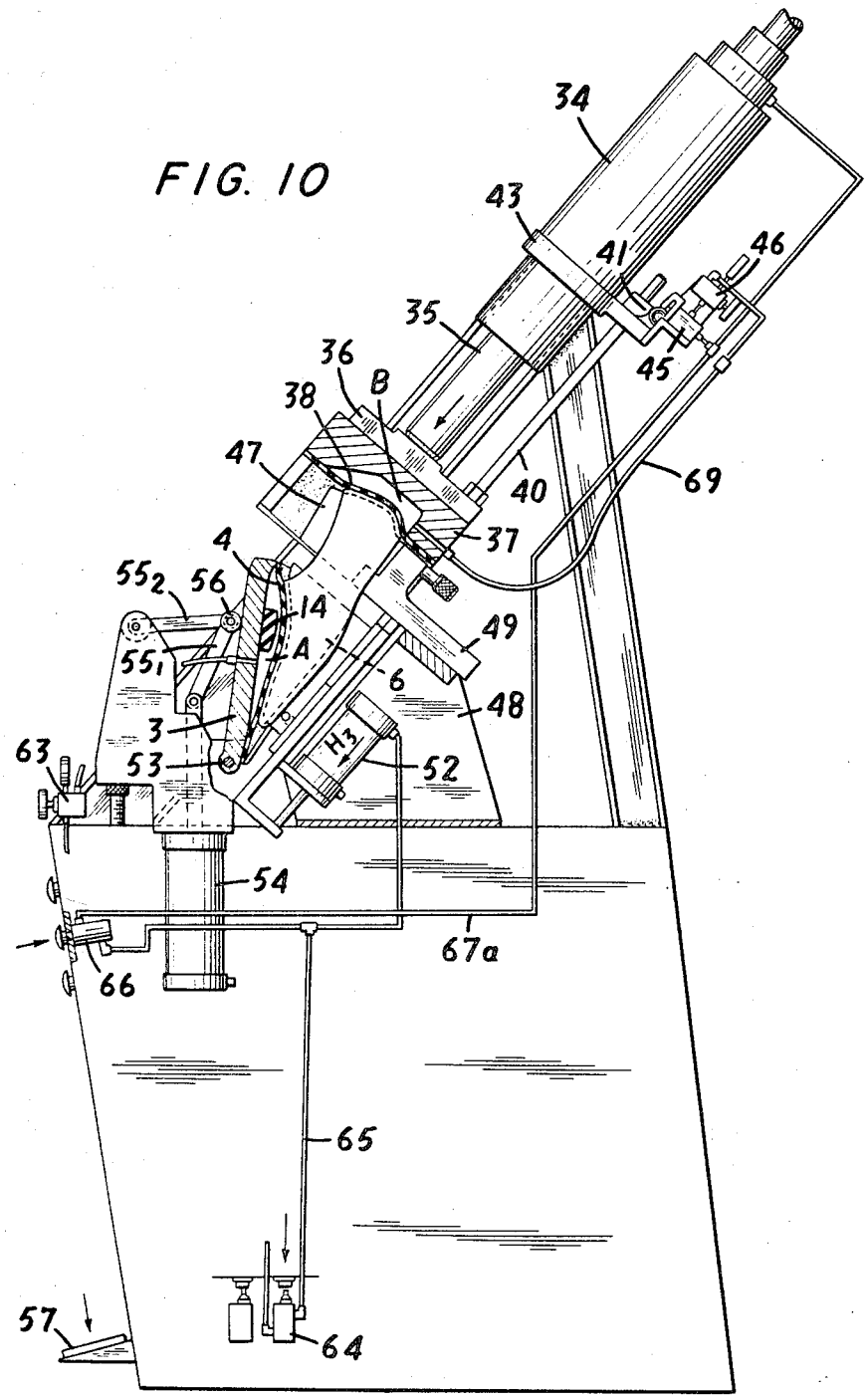

3,440,672
Patented Apr. 29, 1969

3,440,672
SHOEMAKING DEVICE
André Paul Edouard Fromantin, 37 Rue Caulaincourt,
Paris, France
Filed Feb. 15, 1967, Ser. No. 616,396
Claims priority, application France, Feb. 21, 1966,
50,444
Int. Cl. A43d *11/12, 65/00*
U.S. Cl. 12—142                         15 Claims

ABSTRACT OF THE DISCLOSURE

Apparatus and method using molds for molding the forpart of shoe uppers and other mold arrangements for molding the rear parts of shoe uppers. The molds use one or more inflatable cushion which envelops the parts of the shoe uppers being molded and causes the upper to conform to the desired shape of a shaped mold corresponding to the desired shape of the finish molded upper. A cushion for molding the forepart of the shoe uppers has a mold element that applies greater pressure to the instep zone of the shoe upper and curves it to conform with the proper instep shape. This instep-molding element is applied to the instep zone or area of the shoe uppers before the inflatable mold cushion is inflated with a pressure medium. The molds and cushion arrangements can carry out a drawing of stretching of the shoe uppers to eliminate creases and save material.

---

The present invention relates generally to shoes and more particularly to shoe making apparatus and to apparatus for molding shoe uppers and machine modifications for molding upper backs by provision with the apparatus of the invention.

For many years, shoe manufacturers and shoe machine makers have applied themselves to the problem of molding shoe uppers. Men's shoes in particular are difficult to mount correctly on a form if the shoe upper has not been preformed to facilitate mounting on the form or mold. None of the methods and apparatus developed up to now have allowed correct fitting of a shoe upper on a form because these methods and apparatus were not based on molding.

Some shoe manufacturers heretofore hit on the idea, not of preforming shoe uppers, but of giving them an advance configuration by a longitudinal fold which was made in the medial axis of the shoe upper by means of a slide. In these known methods molding was not involved; a simple fold was used which caused serious problems in assembly of the shoes. In addition, these operations were carried out only on the shoe uppers and as a consequence a second operation was needed to form the rear part of the same uppers.

A principal object of the present invention is to obviate these disadvantages.

Another object of the present invention is provision of a device to mold shoe uppers, imparting to these uppers a configuration allowing them, during subsequent assembly operations, to fit perfectly a form on which they will be mounted.

Still another object of the present invention is to allow either the adaptation of the apparatus embodying the invention to existing machines designed for the preforming of the rear parts of uppers, or the application of the apparatus to a machine for molding the rear part of shoe uppers. When the apparatus is incorporated into the structure of a machine constructed to mold the rear parts of shoe uppers, total molding of the shoe upper and of all its components (lining, buttress and hard end) will be obtained.

A feature of the present invention is the provision of an apparatus having a framework on the lower base of which is mounted a front mold. A mobile cushion is mounted in the axis of this mold so that it can come into contact with a shoe upper arranged on the mold, to ensure the desired shape of the upper. Preferably the front mold comprises a profile (shaped part) allowing generally molding the entire forward part of the shoe upper. The mold comprises cavities inside of which are arranged heating means to heat the shoe uppers and improve assembly of the components parts (upper, lining, hard end) thereof.

The mobile cushion movement is effected by a double-action jack. The cushion has a supple membrane limiting an enclosure in which is fixed a resilient block, made, for example, of rubber, placed so that when the cushion descends on the mold, the block acts on the upper in an area approximately at the area of the instep.

Another feature of the invention is a machine for premolding or forming the rear parts of shoe uppers and equipped with a device for molding shoe uppers similar to the foregoing method and apparatus. Moreover, the front molding means is incorporated into a machine for premolding the rear parts of shoe uppers.

Other features and advantages of the apparatus in accordance with the present invention will be better understood as described in the following specification and appended claims, in conjunction with the following drawings in which:

FIG. 8 is a side elevation view in section of a machine for preforming the rear parts of uppers;

FIG. 9 is a side elevation view of apparatus in FIG. 8 illustrating the closure of a front cushion effecting the molding of a shoe upper, and the inflation of a mold cushion; and FIG. 10 is a side elevation view of apparatus in FIG. 8 illustrating the withdrawal of the shoe upper, and the operation of a rear cushion for effecting molding of the rear parts of uppers.

Figure 1:
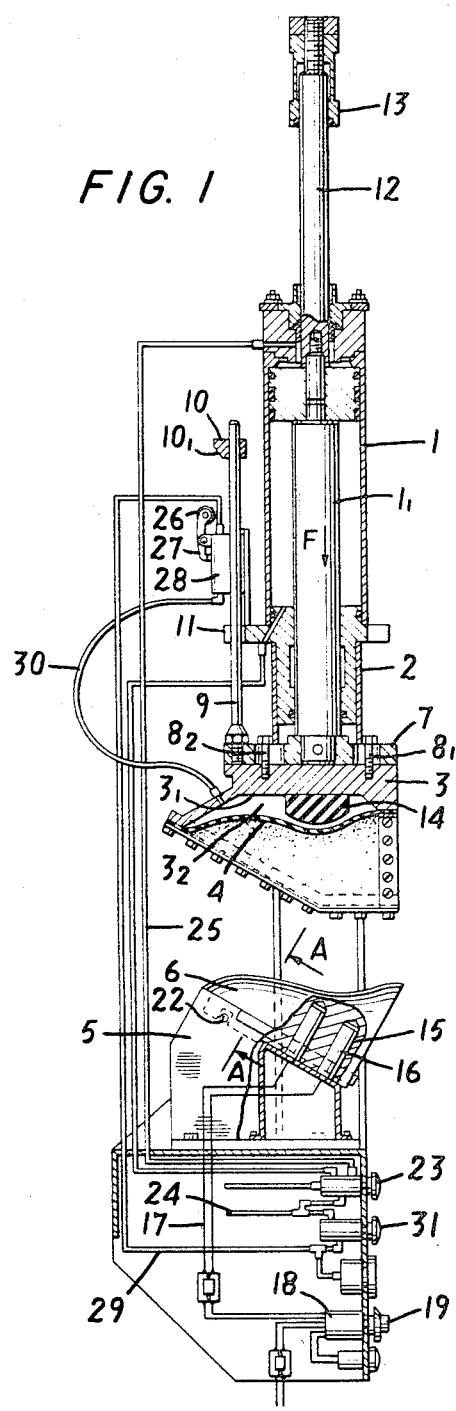
FIG. 1 is a section side elevation view of a shoe making device, controlled by pneumatic means, according to the invention.

The upper-molding device or apparatus comprises a double-action jack 1, forming an integral part of an upper part of a framework 2. The jack has at its lower end a counter-die or cushion 3, whose side-wall $3_1$ is enclosed by an elastic membrane 4. On the lower part of the framework 2 is fixed a mold support 5 in which a mold 6 can be engaged and locked. The cushion 3 is connected to the framework of the machine by a base-plate 7 to which it is connected by screws and bolts $8_1$ and $8_2$.

On this base-plate 7 is mounted, parallel to the piston $1_1$ of jack 1, a sliding bar $9_1$ which is integral with a piston reciprocable in the jack 1, and thus follows its reciprocating movement. On the upper part of this sliding bar 9 is fixed a cam 10 presenting an inclined plane $10_1$ facing towards the base of the device. The sliding bar is guided in a guide opening provided in an annular guide flange 11. On the upper part of the jack is provided a stroke-limit thrust-block 13 which limits downward travel of the piston but allows placing of the cushion 3 in relation to the mold 6.

A block of resilient material 14 is inserted between the metal body of the cushion 3, that is, between a face $3_1$ of the cushion, and the supple elastic membrane 4 closing off one side of this cushion. This resilient block represents a great advantage in the molding of a shoe upper, since it is placed so as to act on the instep area of the upper, so as to press down this zone or area before the inflation of the cushion 3 takes place as later explained.

The mold has a shape corresponding to that of a shoe, so that molding takes place over the entire surface of a shoe upper when it is being molded in the apparatus of the invention. The mold is preferably made of metal, and has on the inside one or more cavities 15, in which can be placed heating elements 16 supplied from an electrical connection 17 controlled by a thermostat 18 whose operating knob or button 19 projects outwardly from the front of the framework of the device.

The support 5 has a central channel 20 in which a tenon 21 provided at the lower base of mold 6 can engage. As shown in FIG. 1, a locking-spindle 22 immobilizes the mold 6 in relation to its support 5.

The device or appartus functions as follows:

Cutout shoe uppers, whose sections may, if desired, have been premolded, are placed on the mold 6 which has already been brought to the desired temperature by control of the thermostat 19. Descent-control of the rear cushion 3, by the action of the jack 1, is effected by a push-button valve 23. When valve 23 is activated air under pressure is supplied, from an air pressure source, not shown, through a line 24 and a conduit 25 to the upper part of the jack cylinder effecting downward movement of the piston $1_1$ in the direction of the arrow F.

During downward movement of the piston, the sliding bar 9 also moves downwardly until the cam 10 bears on a roller or cam follower 26 of a pivoted lever 27 of an air valve 28. The lever 27 opens the air valve 28 only when the cushion 3 is in position on the shoe upper being molded. Opening of the valve 28 allows introduction of air under pressure into a compartment $3_2$ of the cushion 3 by means of hoses or conduits 29 and 30. The air pressure in the line 29 is supplied from the air source and is controlled by a manual release control 31.

When the operator thinks the molding action of the cushion 3 on the upper of the shoe has been long enough, he will deflate the cushion and raise the piston $1_1$, either by the individual control provided on the apparatus or control means on the machine on which the apparatus of the invention is applied.

Figure 4:
FIG. 4 is a perspective view of the upper of a shoe before the molding of the upper according to the invention.
Figure 5:
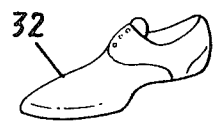
FIG. 5 is a perspective view of the shoe upper in FIG. 4 after molding.
Figure 6:
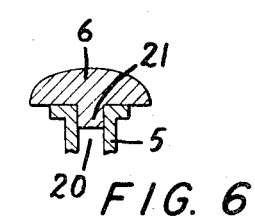
FIG. 6 is a section view taken along section line A—A of FIG. 1, illustrating a detail of the assembly of a front mold with relation to a mold support.
Figure 3:
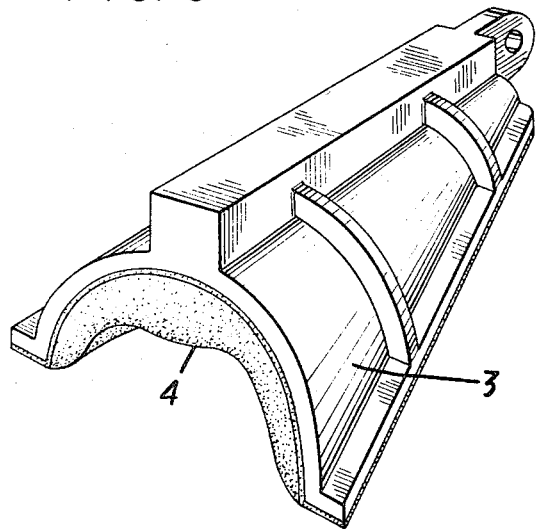
FIG. 3 is a perspective view of an inflatable cushion molding for the forward part of shoe uppers.

The technical advantages gained by the device are definite not only does the cushion entirely envelop the shoe upper (FIG. 3) but rubber block 14 preforms the upper at the instep area which avoids creases in the upper. FIG. 4 illustrates the shape of a shoe upper, before it has undergone the premolding operation. FIG. 5 illustrates this same shoe upper after the molding operation. It can be clearly seen that the frontal part of the upper has received a shape corresponding almost to the definitive form which the upper will have when assembled. Further, it can be seen that there is, in a zone 32, a slight incurvation corresponding to the action of the rubber block 14 provided in the cushion 3.

Figure 7:
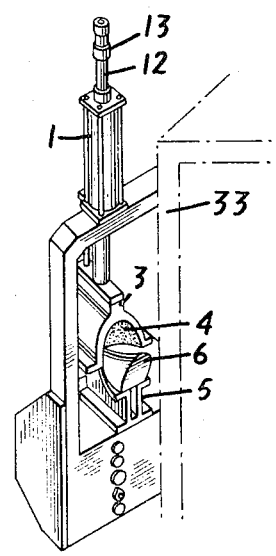
FIG. 7 is a fragmentary perspective view of the apparatus according to the invention applied to an existing machine designed to preform the rear parts of uppers.

FIG. 7 illustrates the adaptation of an apparatus according to the invention on a framework 33 of a machine, already capable of premolding the rear parts of shoe uppers. In known processes, it is necessary to proceed on the one hand to mold the rear parts of uppers, then, by a second operation, and on a second machine, mold the frontal part of the same uppers. This necessarily results in a considerable loss of time, greatly increasing the cost of the shoes being fabricated.

According to FIG. 7, the device of the invention, which has relatively compact dimensions, can be fixed on the framework of a known machine serving to premold the rear parts of uppers, then connected to operate synchronously with the pneumatic control of this main machine, so that when the operator releases an upper from the machine for molding the rear part thereof, he can place this upper in the inventive device, serving to mold the forepart, and the molded upper will be automatically released at each change in work-position. In this way the upper can be passed in sequence from the rear mold to the front one, without having been replaced in the production line, as would be the case with two different machines. The invention therefore not only extends to the molding device for shoe uppers, but also to machines equipped with this device, since it allows, in combination with these machines, the molding of the front and back, of shoe upper, in a minimum space of time.

Figure 2:
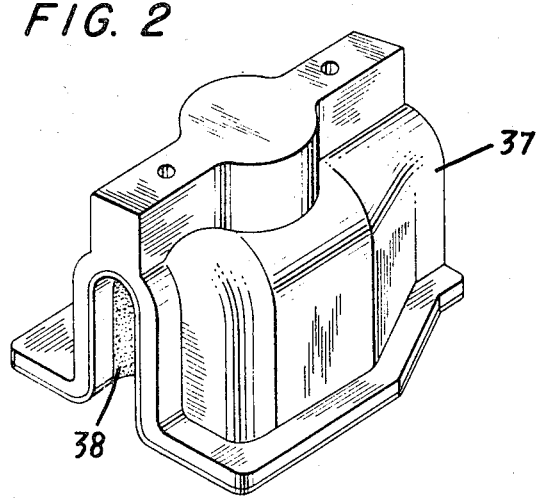
FIG. 2 is a perspective view of inflatable cushion molding for the rear part of shoe uppers.

According to FIG. 8, the device can be likewise incorporated into a machine, during manufacture of the machine for molding the rear parts of uppers. The apparatus in FIG. 7 is made independently and then connected to any existing machine designed for molding of the rear parts of shoe uppers. According to this embodiment of the invention the machine comprises a double-action jack 34, in which is housed a reciprocably driven piston 35 and at the lower end of which is fixed, by means of a base plate 36, a counter-die or rear cushion 37. This cushion has an elastic resilient membrane 38 forming a boundary to a compartment 39 which can receive a pressure-medium, such as compressed air. This cushion is shown in perspective in FIG. 2.

On the base-plate 38, and parallel to the piston rod of the piston 35 of the jack 34, is fixed a sliding bar 40 at the top of which is fixed a cam 41 with an inclined plane $41_1$. This sliding bar is slidably guided, in reciprocating movement with the piston; by an opening 42 in an annular stationary flange 43. A roller-valve combination 45, to which is attached a manual release 46 is fixed by means of gudgeon 44, to the flange. This valve is opened by the cam $41_1$. Under this assembly, in the central vertical plane of the cushion 37, a rear mold 47 is mounted. The mold 47 is fixed on a mold-support 48, by means of a plate 49. The rear mold 47 comprises a cavity 50, which can receive one or more heating elements 51.

On the same support 48 is mounted the front mold 6' which has to, in conjunction with the frontal cushion 3', effect the molding of the individual shoe uppers. This mold support, as shown in FIG. 4, has a channel containing the mold 6' so that the latter can make a movement of translation. The control of the mold is effected by a double-action jack 52. This mold is identical to that shown in FIG. 1 and comprises two sleeves 15' into which are inserted heating units 16'.

As in FIG. 1, the frontal mold comprises an elastic membrane 4' and a resilient block 14' whose function has already been described. In this variant, the frontal mold is articulated on the mold-support 48, by means of a pivot 53. Because of this, the mold can pivot about this rotation-point 53, in both directions indicated by an arrow G.

Control of the angular movement of the mold 3' is on the one hand effected by a double-action jack 54 and, on the other, by a set of push-rods $55_1$, $55_2$, a roller 56, provided at the point of articulation of these two push-rods acting on a rear face $3_3$ of the cushion 3'.

The machine functions as follows:

The cut and punched uppers are placed on the front and rear molds, which themselves have been adjusted to a certain length, which is a function of the size of the shoe to be obtained. When the upper has been correctly put in place on both molds, front and rear, the operator then proceeds to close the front cushion 3, by depressing a control pedal 57 located at the base of the machine, which controls the opening of a valve 58, which, by means of a line 59, supplies the double-action jack 54 (FIG. 9) with pressure fluid, for example compressed air. Under the effect of this pressure fluid, the piston 60 moves in the direction of arrow H (FIG. 8) and forces the two push-rods $55_1$ and $55_2$ to close the molds. The push-rod $55_2$ moves at an angle in the direction of arrow $H_1$ so that, at the end of its stroke, it takes up an approximately perpendicular position relative to the face $3_3$ of the cushion 3' (as shown in FIG. 9).

Under the effect of the push-rods controlled by the jack 54, the cushion swings on its point of rotation 53, so as to bear on the front mold 6. The rubber block 14 partially crushes the upper at the instep zone or area so as to preform it before inflation of the cushion takes place. The position shown in FIG. 9 shows the front cushion closed and the rubber block 14 in contact with the shoe upper. In this position, the orientation of the push-rod $55_2$ is such that the front cushion is locked.

The operator then inflates the front cushion, by blowing into a compartment A, bounded by the metal body of the cushion and the flexible membrane, a pressure medium which allows this cushion to fit perfectly over the entire frontal surface of the upper. This inflation is effected, as shown in FIG. 9, by means of a valve 61 which ensures connection between the supply line 59, and a flexible line 62, which leads directly to the compartment A of the front cushion. Between the two channels 59 and 62 is disposed a manual release control 63 which controls the pressure of the fluid which is to be applied to the pressure compartment of the front cushion.

The action on pedal 57 determines in the first instance the closure of the front cushion by the jack 54, the valve 61 in this case is closed. Activation of the valve 61 ensures the continuity of the pressure supply circuit as far as the pressure compartment of the front cushion and, by the same action, its inflation, so as to effect total molding of the entire front part of the upper. When the molding of this part of the upper has been carried out, there follows the drawing of the upper, which can be effected under excellent conditions, because the front mold and the front cushion, since they are integral parts of the same support 48, can move in relation to the rear mold.

Control of the general drawing of the upper is carried out in the following way (FIG. 10): If the operator continues to depress the pedal 57, he opens a valve 64 which connects, through a line 65, with the double-action jack 52 a valve 66 which in this case is closed.

Since pressure medium can only reach the jack 52, it controls the movement of the piston 67 in the direction illustrated by an arrow $H_3$ (FIG. 8), which takes with it in this direction the front mold 6 and the inflatable cushion 3. In this case, the two elements (front mold and front cushion) act in the fashion of two jaws and pull on the upper. This tension has the advantage of being exercised on the entire surface of the upper, which avoids localized overtension, from which ensues a good distribution of tension. In addition this drawing is efficient because of the fact that it is exercised by taking as a base the rear mold, which allows drawing of the total length of the upper, and as a consequence a considerable lengthening takes place which results in a great saving in raw materials.

In this secondary phase of the functions of the apparatus and when the drawing has been suitably accomplished, the operator can then carry out the rear molding of the upper, by activating a valve 66, which supplies the rear part of the double-action jack 34 (FIG. 10) with the pressure medium, by means of pressure line 67a.

Under this pressure, the piston 68 (FIG. 10) moves in the direction illustrated by an arrow $G_1$ so as to bring the rear cushion 37 to bear on the rear mold 47, on which the locked upper is kept partially pressed and stretched between the front mold and the front cushion.

At the end of the downward stroke of the piston the cam 41 which is an integral part of the slide 40, which is itself connected to the rear cushion 37, acts on the roller or cam follower of the valve 45, so as to control, by means of a link 69, the supply of air to a compartment B of the rear cushion. Here too, activation of a manual release 46 allows control of the pressure necessary for molding the rear quarters of the upper.

The exact position of front and rear molds is shown in FIG. 10 from which it can be seen that the rear cushion is in close contact with the rear mold, while the front cushion is clearly bearing on the front mold. When the general molding operation is complete, the operator activates a zero-return valve 70, which ensures the deflation of the cushions and the return of the jack's pistons, to their initial starting positions and conditions to ready the apparatus for introduction of a new upper for premolding.

A manometer 71 is provided on the machine and has permanent control of the general pressure of the machine, while, as a safety measure, the electric current supplying the heating elements for the front and rear molds is of a low voltage.

The advantages of a machine constructed according to the invention are as follows:

First of all the machine is entirely automatic; secondly, this machine allows, within one and the same cycle, the general molding of the whole shoe upper. The form of the front mold (which imitates the profile of the assembly form) and the form of the front cushion (which totally envelops the shoe upper) allows excellent formation of the upper, while avoiding creases in the leather on the median axis of the upper. This is accomplished by means of the block of hard rubber, which crushes just the instep zone or area before inflation of the cushion.

The heating means incorporated in the various molds, allow excellent welding for the front part (upper, lining and hard end), and, for the rear part, excellent welding of the components (upper, lining and buttress). In addition, the mobility of the front mold and cushion, which can move in relation to the mold-support, allows generalized drawing of the upper, avoiding any localized overtension and imparts a very good lengthening of the upper. Finally, the oblique or vertical position of the jack controlling the descent, and return, of the rear cushion allows easy control of the position of the rear seam of the upper, with a view to its centering.

While preferred embodiments of the invetnion have been shown and described it will be understood that many modifications and changes can be made within the true spirit and scope of the invention.

What I claim ad desire to be secured by Letters Patent is:

1. Apparatus for molding shoe uppers comprising, a shaped mold on which a shoe upper is disposed for molding thereof, said mold having a shape corresponding to a shape desired to be imparted to said upper, a mobile mold cushion operable in operation to a position engaging an upper on said mold and causing said upper to conform to said shaped mold, said mold cushion comprising an inflatable portion having a flexible membrane bounding said portion and overlying said shoe upper applying pressure over parts of said upper causing it to conform to said shaped mold, and including a mold element in combination with said cushion disposed to engage an instep zone on said shoe upper and apply pressure thereto at least before complete inflation of said inflatable portion for shaping the instep zone.

2. Apparatus for molding shoe uppers according to claim 1, in which said mold element has a configuration for applying a desired curvature to said instep zone.

3. Apparatus for molding shoe uppers according to claim 2, including means to apply a medium under pressure to said inflatable portion at a desired pressure causing said flexible membrane to apply pressure to said shoe upper and conform to said shaped mold.

4. Apparatus for molding shoe uppers according to claim 3, in which said flexible membrane is dimensioned and shaped to overlie the whole foreparts of said shoe upper.

5. Apparatus for molding shoe uppers according to claim 1, in which said cushion comprises an inflatable compartment and said flexible membrane bounds one side of said compartment disposed for overlying said shoe upper and applying pressure to said shoe upper causing it to conform to said shaped mold, and means to selectively inflate said compartment at a selected pressure causing said membrane to apply said shoe upper to said shaped mold at said pressure thereby to mold it on said shaped mold.

6. Apparatus for molding shoe uppers according to claim 5, in which said mold element comprises a resilient element in said compartment applied to said shoe upper said shaped mold in an area corresponding to said instep zone to aply pressure thereto before inflation of said compartment and shaped to apply a desired curvature to said instep zone, said means to selectively inflate said compartment comprising means to inflate said compartment subsequent to application of said resilient element to said instep zone at a selected pressure.

7. Apparatus for molding shoe uppers according to claim 1, including means to cause said shaped mold and said mold cushion to effect a drawing action on said shoe upper.

8. Apparatus for molding shoe uppers according to claim 1, in which said shaped mold comprises means heating said shaped mold for heating a shoe upper when disposed on said mold.

9. Apparatus for molding shoe uppers according to claim 1, including means operating said shaped mold and said mold cushion including means effective to apply tension to said shoe upper thereby to stretch said shoe upper and to avoid localized tensioning.

10. Apparatus for molding shoe uppers according to claim 1, including a second mold cushion for molding rear parts of a shoe upper.

11. Apparatus for molding shoe uppers according to claim 1, including a second shaped mold for shaping and molding rear parts of shoe uppers, and a second mold cushion operated selectively into position cooperating with said second mold for shaping and molding said rear parts of said shoe uppers.

12. Apparatus for molding shoe uppers according to claim 11, in which said cushion comprises inflatable means having means to apply pressure to said rear parts of shoe uppers to conform them to said second shaped mold.

13. Apparatus for molding shoe uppers according to claim 12, including means to selectively heat said second shaped mold.

14. A method for molding and shaping shoe uppers comprising, providing a shoe upper to be molded, placing the shoe upper on a mold shaped to a desired shape to be imparted to said shoe upper, applying a flexible membrane over the shoe upper parts under a progressively increasing pressure causing said shoe upper to conform to said mold for a period of time to cause it to assume a desired shape correspoding to the shape of surfaces on said mold and at least before applying said flexible membrane at a maximum pressure of application thereof applying a localized pressure on an instep zone on said shoe upper to cause said instep zone to conform to said shaped mold thereby to apply a desired curvature to said instep zone before molding completely other parts of said shoe upper.

15. A method for molding and shaping shoe uppers according to claim 14, including applying heat to said shoe upper at least during application of said flexible membrane under pressure.

References Cited

UNITED STATES PATENTS

| | | | |
|---|---|---|---|
| 2,062,307 | 12/1936 | Greene | 12—54.2 |
| 2,692,400 | 10/1954 | Altvater | 12—54.2 |
| 2,983,934 | 5/1961 | Bertrand | 12—54.3 |
| 3,039,288 | 6/1962 | Torre et al. | 12—54.3 X |

PATRICK D. LAWSON, *Primary Examiner.*

U.S. Cl. X.R.

12—54.3